Figure 1:
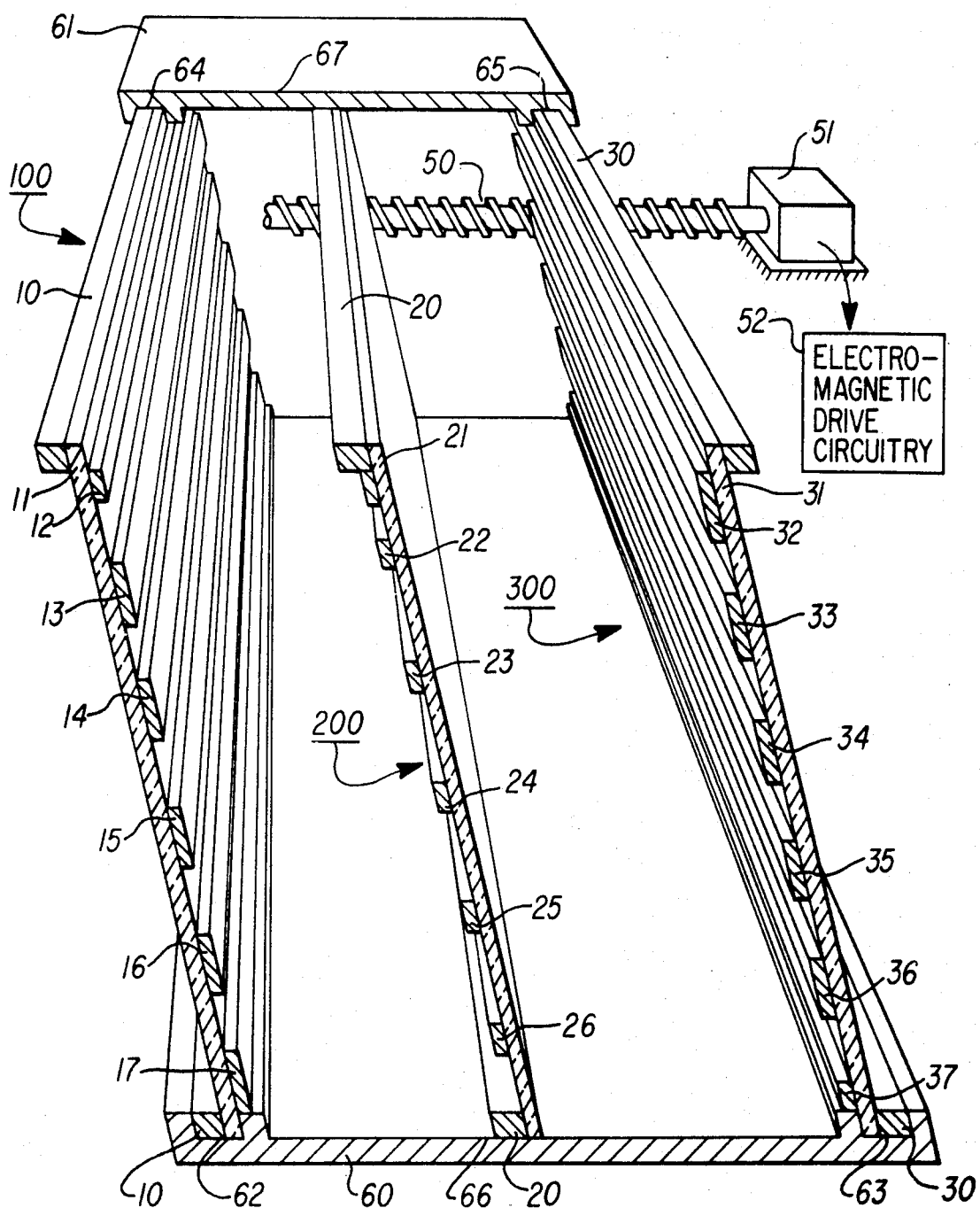

United States Patent
Williams

[15] 3,659,919
[45] May 2, 1972

[54] TRI-LEVEL INTERFEROMETER

[72] Inventor: Charles Sumner Williams, Dallas, Tex.
[73] Assignee: Texas Instruments Incorporated, Dallas, Tex.
[22] Filed: Dec. 12, 1968
[21] Appl. No.: 783,337

[52] U.S. Cl. ............................................. 350/166, 356/112
[51] Int. Cl. ................................. G02b 1/10, G01b 9/02
[58] Field of Search ............................. 350/163–166; 356/112

[56] References Cited

UNITED STATES PATENTS 3,410,626  11/1968  Magrath ........................... 350/166

FOREIGN PATENTS OR APPLICATIONS 665,978  9/1938  Germany ........................ 350/163
758,896  2/1953  Germany ........................ 350/163

Primary Examiner—David Schonberg
Assistant Examiner—Toby H. Kusmer
Attorney—Samuel M. Mims, Jr., James O. Dixon, Andrew M. Hassell, Harold Levine, John M. Harrison, Melvin Sharp and John E. Vandigriff

[57] ABSTRACT

Disclosed is an interferometer having three mutually parallel levels, each having a plurality of reflective stripes which divide light entering the interferometer into two groups of parallel beams to permit the phase difference between the beams to be determined by the position of the center level relative to the outer levels.

2 Claims, 2 Drawing Figures

Patented May 2, 1972

3,659,919

2 Sheets-Sheet 1

INVENTOR
CHARLES SUMNER WILLIAMS

BY John M. Harrison

ATTORNEY

MIRROR MOTION

TRI-LEVEL INTERFEROMETER

This invention relates to improvements in optical devices and more particularly to improvements in interferometers.

Interferometers are optical devices which divide light incident thereon into two or more mutually comparable beams, and are useful in such applications as performing spectral analysis, or determining small linear displacements, spectral fine structure, and indices of refraction. The interferometer of the invention, although useful as any ordinary interferometer, is particularly intended for use as a spectrometer interferometer for analyzing light to determine the component wavelengths present and the magnitude of each component.

Of primary concern in the design and construction of spectrometer interferometers is the bandwidth of the light frequencies over which operation is intended. Commonly, interferometers, such as the Michelson interferometer, depend on the transmission and reflectance characteristics of a beamsplitter used within the interferometer. Since the effects of reflectance from the beamsplitter are different from the effect of the transmittance through it, except, perhaps, within a very limited frequency band, obtaining such interferometer which is operable over a wide frequency range (for example, of wavelengths from 5 to 30 microns such as would be encountered in applications involving infrared radiation from thermal sources such as the earth) is virtually impossible.

In attempts to achieve an interferometer operable over a wide bandwidth, use of grating beamsplitters has been proposed. Grating beamsplitters avoid the above problem of transmitting and reflecting various wavelengths differently because the grating divides the wavefront rather than the amplitude of the impinging beam. For example, a grating beamsplitter and interferometer design are described in copending application, Ser. No. 757,371, filed Sept. 4, 1968, now abandoned by Charles sumner Williams (the inventor herein) and Lee R. Reid entitled "Thin Film Wavefront Dividing Beamsplitter," (TI-2674), which application is assigned to the assignee of the present application and incorporated by reference herein. Although the advantages and advancements of the beamsplitter and interferometer of the above-named copending application are apparent, the present invention represents an even further improvement because it can be used when the degree of coherence of the light to be analyzed is very small. Coherence, which is important in the operation of an interferometer, is generally understood to be the phase correspondence of the light waves at various points in a beam. This coherence can be visualized by considering two points in a light beam, each disposed in a plane perpendicular to the direction of travel of the beam. If a vector representing the electromagnetic character of the light is constructed at each point, and the two vectors correspond in phase, except for a constant phase difference, the light is said to be "spatially coherent." The farther apart the points can be taken in the plane without destroying the correspondence between the vectors, the higher the degree of spatial coherence of the beam. If, instead, the points are taken along a line in and parallel to the path of the beam, and the electromagnetic vectors correspond, the light is said to be "time coherent." Thus, light from a laser source is considered to have a high degree of coherence, since the electromagnetic vectors correspond everywhere along the length, height, and width of the beam. On the other hand, light from the thermal source, such as an incandescent lamp or the earth, has a low degree of coherence since the electromagnetic vectors neither correspond in the direction of travel of the beam nor in a plane perpendicular to it. Therefore, to analyze a light beam having a low degree of coherence is much more difficult than one having a high degree of coherence, because finding corresponding light components at spaced points in a beam of low coherency is more difficult.

It is, therefore, an object of the invention to provide an interferometer which can be used in the infrared wavelength of the electromagnetic spectrum.

It is a further object of the invention to provide an interferometer which can be used in conjunction with light sources having a small degree of coherence.

Figure 2:
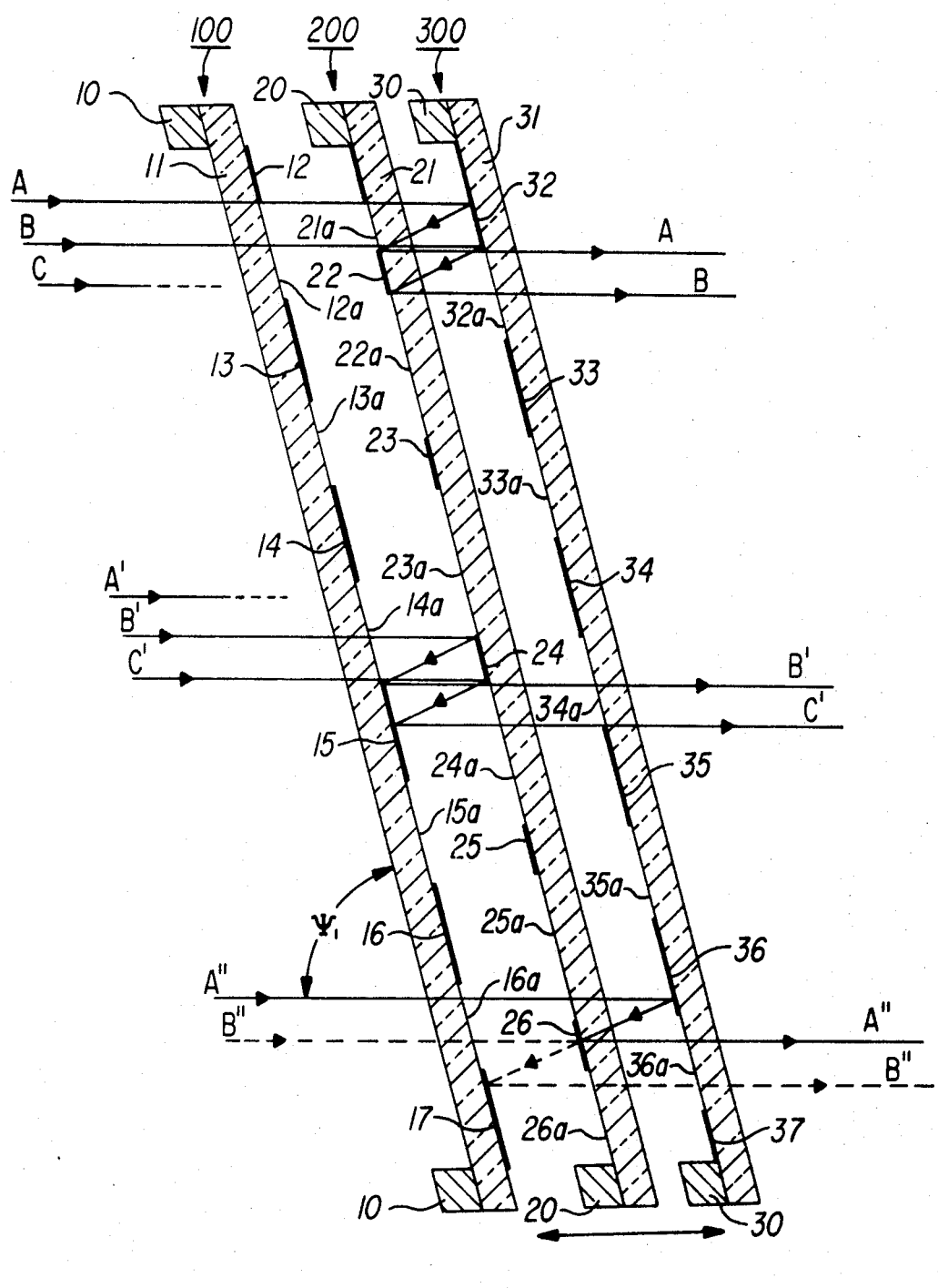

Other objects, features, and advantages of the invention can be readily seen from the appended claims when read in conjunction with the following detailed description and the attached drawings in which:

FIG. 1 is a perspective view of a partially cut-away beamsplitter in accordance with the invention, and FIG. 2 is a side view of the beamsplitter of the invention, which has been cut away to show its operation and the relationship between its parts.

In accordance with the invention, an interferometer is provided which has three parallel levels, each level consisting of a grating of alternating reflective and transmittive portions. (The term "grating" as used herein is understood not to mean exclusively the type of grating often referred to as a "diffraction grating" which acts to disperse the colors in a multichromatic beam). The center level functions as a wavefront dividing beamsplitter which is movable toward and away from the other two levels to control the phase of the two beams formed by the grating of the first level.

Referring now to FIG. 1, it can be seen that the interferometer of the invention has three levels, hereinafter referred to, respectively, by reference numbers 100, 200, and 300. Each level is constructed upon a frame, designated respectively by reference numbers 10, 20, and 30, and is configured into a grating pattern of stripes, reflective from both sides. The stripes may be formed, for example, by vapor deposition on a pellicle such as the pellicle described in copending patent application, Ser. No. 497,294, filed Oct. 18, 1965, by Lee R. Reid, entitled "Beam Splitter," said application being assigned to the assignee of the present application and incorporated herein by reference. The pellicle as therein described may be of a nitrocellulose material and of a thickness of approximately 0.5 micron. Such reflective stripes may be, for example, of gold, silver, aluminum or other similar reflective material, but of particular importance is that the reflecting surfaces be optically flat, representing as true a plane as possible. To be understood is that the use of a pellicle as a base for mounting the stripes is not an absolute requirement, as the gratings could be constructed in a number of different ways; for example, the grating may be etched through steel sheets polished to optical flatness and coated with a reflective material, or a reflective material could be deposited upon a pre-cut transparent substrate. Since interferometers deal with differences in distances the size of a wavelength of light, it can be appreciated that very slight defects in the optical flatness can introduce large errors in the output. It has been found convenient to define the term "optically flat" as a flatness having no variations from a true plane greater than approximately one wavelength of green light; however, this requirement may be relaxed for particular uses wherein such close accuracy is not required.

The levels are mounted and supported in a given relation to one another by frames 60 and 61, constructed, for example, of aluminum, Bakelite, formica, or other suitable material. Frames 60 and 61 are identical, having grooves, 62 and 63, 64 and 65, respectively, cut therein to receive a portion of the outside beam splitter levels 100 and 300. Between the grooved portions of frames 60 and 61, flat recessed portions 66 and 67 are, respectively, formed to accommodate the inner level 200, allowing it to travel freely in the direction perpendicular to its own plane and also perpendicular to the plane of the other two levels. The inner level 200 may be moved by a connection (not shown) to a worm gear 50, driven by a driving means 51. Such driving means 51 may be activated by an electro-magnetic drive circuit 52 which may in turn respond to a computer program or other external stimulii. Although not shown, a driving means, perhaps a similar worm gear mechanism, may be utilized on the opposite side of the center level to ensure that the inner level 200 moves uniformly with respect to the outer levels 100 and 300.

For a detailed description of the operation of the interferometer, reference is made to FIG. 2. The three levels of the beamsplitter are mounted in mutually parallel planes, disposed at an angle, $\Psi$, to the oncoming light beam to affect proper reflection within the interferometer. Light enters the interferometer through the transparent areas 12a, 13a, 14a, 15a, and 16a among the reflective stripes 12, 13, 14, 15, 16, and 17 of the first level 100, to form five beams of generally rectangular cross section, three of which being shown in FIG. 2.

The other two levels, 200 and 300, are constructed similarly to the first level 100 except the reflective stripes deposited on them are of widths and spacings appropriate to modify the light beams passing through the first level 100 as follows. Each beam passing through the first level impinges upon the second level 200, where it is divided by a grating stripe on the second level into two rectangular light beams, one passing through the second level 200 to impinge upon a reflecting stripe on the third level 300, and the other reflecting from the second level 200 to impinge on the back side of a reflective stripe on the first level 100. The light beam incident upon the reflective stripe on the third level 300 is reflected a first time to the back side of a reflective stripe on the second level 200, and is there reflected a second time to pass through a transparent portion of the third level 300. The light beam which was reflected for the first time from a stripe on the second level 200 is reflected a second time from the back sides of a stripe on the first level 100 to pass through transparent areas of both the second and third levels. Both beams then emerge from the interferometer, each having been reflected twice and passed through three levels, in generally parallel paths.

To demonstrate the operation of the interferometer, three examples of the possible light paths through the interferometer are shown in FIG. 2. One portion of one of the beams passing through the first level 100 is shown at the uppermost part of the drawing, and is denoted at its edges by the characters A, B, and C. A portion of the light beam passes through the transparent portions 12a and 21a of the first and second levels, respectively, to impinge upon the reflective stripe 32 on the third level 300. The beam is reflected from the stripe 32 on the third level 300 onto the backside of reflective stripe 22 on the second level 200, and reflected by stripe 22 to be transmitted through transparent area 32a of the third level 300.

The other possible path of a light beam passing through the first level 100 is shown in the center area of the drawing of the beamsplitter in FIG. 2, and is denoted by the characters A', B', and C'. A portion of the light beam transmitted through transparent area 14a of the first level impinges upon the front side of reflective stripe 24 on the second level 200, and is reflected therefrom to the back side of reflective stripe 15 on the first level 100. The beam is reflected from stripe 15 through transparent areas 24a of the second level 200 and 34a of the third level 300.

A composite light beam is shown in the bottommost portion of the drawing of FIG. 2, and the center portions of the beams respectively corresponding to beams A-B and B'-C' are denoted by the characters A'' and B''. The light beam, entering as a single beam, passes through transparent area 16a and impinges upon the second level 200. One portion of the beam passes through transparent area 25a of the second level 200 to impinge upon reflective stripe 36 at the third level 300, reflects therefrom to the backside of reflective stripe 26 of the second level 200, and reflects therefrom to pass through transparent area 36a of the third level 300. The other portion of the beam reflects from the front side of stripe 26 of the second level 200 to the back side of stripe 17 of the first level 100, and reflects therefrom to pass through the transparent area 26a of the second level 200 and the transparent area 36a of the third level 300. The two beams then emerge from the interferometer in substantially parallel paths. The parallel beams are then processed by a light processing device (not shown), such devices being well known in the art.

As above mentioned, the degree of coherence of the light to be analyzed is a prime consideration in the design of the interferometer. The degree of coherence of the light to be resolved determines the grating separation of the first level 100, in FIG. 1. Once the spacing of the first level grating 100 is determined, the grating separations on the other two levels is determinable as above described. The higher the degree of coherency of the light beam, the wider spaced the grating on the first level can be; alternatively, the lower the degree of coherence of the light beam, the closer the gratings must be to resolve the light components.

Another less critical consideration in the interferometer design is the spacing between the levels. Light waves passing through a grating, such as that shown in the figures, are formed by the first level into a generally rectangular beam; however, the beams are diffracted slightly when passing through the gratings so as to form a "pyramid" shaped beam. Although this diffraction is very small and ordinarily is not of great consequence if the distance between each of the levels 100, 200, and 300 is less than 100 to 1,000 times the distance between the gratings of the first level, if the second level is beyond that distance, the rectangularly shaped beam passing through the first level, for example, will not entirely "fit" through the gratings of the second level. This would cause reflections between the first and second levels, reduce the efficiency of the interferometer, and, possibly, introduce extraneous signals into the output of the system. Of course, this would also occur between the second and third levels if the spacing therebetween were not proper.

It can be seen from the above discussion that the grating size can be somewhat arbitrary, but must be constrained within limits depending upon the degree of coherence of the expected source of light to be analyzed and the distance from the source. Also the spacings between the levels are also somewhat arbitrary, but are constrained by the spacings of the gratings and the distance the center level must move.

Although the invention has been described and illustrated with a certain degree of particularity, it is understood that the present disclosure is made only by way of example and that numerous changes in the details of the construction in the combination and arrangement of parts may be resorted to without departing from the spirit and scope of the invention as hereinafter claimed.

What is claimed is:

1. An interferometer comprising:
 a first optically flat thin film transparent pellicle disposed at a preselected angle to an oncoming light beam,
 a first plurality of optically flat reflective stripes affixed to said first pellicle defining a grating of sequential reflective and transparent areas,
 a second optically flat thin film transparent pellicle disposed in a plane parallel to and movable toward and away from said first pellicle, said second pellicle being spaced apart from said first pellicle by a distance less than about 1,000 times the distance between the stripes of said first pellicle,
 a second plurality of optically flat reflective stripes affixed to said second pellicle each disposed so as to divide light transmitted through said first pellicle into two beams, one transmitted through said second pellicle and the other reflected back upon said plurality of reflective stripes of the first pellicle so that the beam reflected from said plurality of stripes on said first pellicle is transmitted through said second pellicle,
 a third optically flat thin film transparent pellicle in a plane mutually parallel to the planes of said first and second pellicles, said third pellicle being spaced apart from said second pellicle by a distance less than about 1,000 times the distance between the stripes of said second pellicle,
 a third plurality of optically flat reflective stripes affixed to said third pellicle in a relationship such that said beam of light which was transmitted through said first and second pellicles is reflected by one of said third plurality of stripes onto one of said second plurality of stripes, and the reflected beam from said second plurality of stripes is transmitted through said third pellicle upon a detector, and said light beam which was reflected from said second plurality of stripes, said first plurality of stripes, and transmitted through said second pellicle is transmitted through said third pellicle and to also impinge upon said detector, and an electro-magnetic drive means for moving said second pellicle in a direction parallel to said first and third pellicles, whereby movements of said second pellicle will cause the phase between said two emerging beams of light impinging upon said detector to be changed.

2. The interferometer of claim 1 wherein said reflective stripes are selected from the group consisting of gold, silver, and aluminum, said stripes being formed on said pellicle by vapor deposition.

* * * * *